US006859699B2

(12) United States Patent
Carroll et al.

(10) Patent No.: US 6,859,699 B2
(45) Date of Patent: Feb. 22, 2005

(54) NETWORK-BASED METHOD AND SYSTEM FOR DISTRIBUTING DATA

(75) Inventors: Anthony Carroll, Cork (IE); Brian McAuliffe, Co. Cork (IE); Joe Gibbs, County Limerick (IE); Brian O'Sullivan, County Cork (IE); Michael J. Kling, III, Delafield, WI (US); George M. Gill, Vilonia, AR (US); Michael L. Baird, Morro Bay, CA (US); Jean deBelleuille, Harpswell, ME (US); Steven W. Rogers, Conway, AR (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/066,795

(22) Filed: Feb. 6, 2002

(65) Prior Publication Data

US 2003/0097211 A1 May 22, 2003

(Under 37 CFR 1.47)

Related U.S. Application Data

(63) Continuation-in-part of application No. 10/054,793, filed on Jan. 25, 2002, now Pat. No. 6,560,516, which is a continuation of application No. 08/962,023, filed on Oct. 31, 1997, now Pat. No. 6,405,111, which is a continuation-in-part of application No. 08/857,725, filed on May 16, 1997, now Pat. No. 6,285,932.

(51) Int. Cl.$^7$ .......................... H04L 12/28; B60R 16/02; G06F 19/00
(52) U.S. Cl. ........................... 701/33; 701/35; 717/172; 717/177
(58) Field of Search .............................. 701/33, 29, 32, 701/35; 702/113; 709/220, 221; 705/400, 500; 707/104; 717/168, 172, 173, 177, 178

(56) References Cited

U.S. PATENT DOCUMENTS 5,717,595 A * 2/1998 Cherrington et al. ....... 705/400
6,067,582 A   5/2000 Smith et al.

(List continued on next page.)

FOREIGN PATENT DOCUMENTS

EP   1 113 359   4/2001
WO   WO 01/31852   5/2001

OTHER PUBLICATIONS

"Hunter Highlights", Hunter Engineering Co., vol. 70/2001, 4 pages, Sep. 2001.*
"Hunter Hightlights", Hunter Engineering Co., vol. 57S/200, 4 pages, Aug. 2000.*

(List continued on next page.)

Primary Examiner—Tan Q. Nguyen
(74) Attorney, Agent, or Firm—McDermott Will & Emery LLP

(57) ABSTRACT

A network-based method and system for distributing data, such as service data for various types of service processes and models, including software applications, specifications, user's manuals, or parameters, etc., over a data transmission network. A remote service provider maintains a database of the data. The database is updated frequently. The remote service provider maintains a website for authorized users to access the data. Authorized users can access and download desired data by connecting to the remote service provider via the data transmission network. Certain approaches are used to verify a user's identity. In one aspect, a combination of a product code that is specific to a system and a license/activation code that is generated based on the product code is verified. Unless a proper combination exists, the downloaded data cannot be properly accessed. The remote service provider also allows users to purchase a license to access the data online. Therefore, users can access the most updated data without waiting for CD-ROMs containing new software or specifications to arrive.

30 Claims, 8 Drawing Sheets

U.S. PATENT DOCUMENTS

| | | | |
|---|---|---|---|
| 6,108,420 | A | 8/2000 | Larose et al. |
| 6,243,692 | B1 | 6/2001 | Floyd et al. |
| 6,263,322 | B1 * | 7/2001 | Kirkevold et al. .......... 705/400 |
| 6,370,455 | B1 * | 4/2002 | Larson et al. ................. 701/33 |
| 6,442,460 | B1 * | 8/2002 | Larson et al. ................. 701/33 |
| 6,556,904 | B1 * | 4/2003 | Larson et al. ................. 701/33 |
| 6,580,916 | B1 * | 6/2003 | Weisshaar et al. ....... 455/456.1 |
| 2001/0011341 | A1 | 8/2001 | Hayes, Jr. et al. |
| 2002/0049529 | A1 * | 4/2002 | Ikeda ......................... 701/200 |

OTHER PUBLICATIONS

"WebSpecs Specification Database", Hunter Engineering Co., 2 pages, 2000 (month is not available).*

Hunter Engineering Co. News Release, 1 page, Jan. 15, 2001.*

Hunter Engineering Co. product operating instructions for using WebSpecs WinAlign 5,1 and Above, 8 pgs, Sep. 2001.*

"Browser–Style Interfaces To A Home Automation Network" 1997 (p.d.), IEEE Transactions on Consumer Electronics, IEEE Inc. New York, US, vol. 43, NR. 4, pp. 1063–1069 XP000768559 ISSN: 0098–3063, (month not available).

* cited by examiner

[ ◉ View Specifications Online ] [ 📄 Download Specifications ] [ 🛒 Buy a License ] [ 👤 My Account ] [ ❓ Support ]
      ⌒31                        ⌒33                          ⌒35                ⌒37              ⌒39

Market: United States Domestic

Manufacturer: ACURA

Please select either Model or Year.

[ Select by Model ▼ ]

OR

[ Select by Year ▼ ]

[ << Back ]

Web Site Comments | Privacy Policy | Legal Notices | Terms & Conditions

*FIG. 3c*

| View Specifications Online | Download Specifications | Buy a License | My Account | Support |
| --- | --- | --- | --- | --- |
| ~31 | ~33 | ~35 | ~37 | ~39 |

Market: United States Domestic

Manufacturer: ACURA

Year: 1999-1999

Model: 3.0CL

FRONT

|  | Min. | Pref. | Max. | Min. | Pref. | Max. |
| --- | --- | --- | --- | --- | --- | --- |
| Caster | 2.30° | 3.30° | 4.30° | 2.30° | 3.30° | 4.30° |
| Camber | -1.01° | 0.01° | 1.02° | -1.02° | -0.02° | 1.02° |
| SAI | --- | --- | --- | --- | --- | --- |
| Individual Toe | --- | --- | --- | --- | --- | --- |
|  | Min. | Pref. | Max. |  |  |  |
| Total Toe |  -0.30° | 0.00° | 0.30° | Max. 0.30° |  |  |

REAR

|  | Min. | Pref. | Max. | Min. | Pref. | Max. |
| --- | --- | --- | --- | --- | --- | --- |
| Camber | -1.00° | -0.50° | 0.00° | -1.00° | -0.50° | 0.00° |
| Individual Toe | --- | --- | --- | --- | --- | --- |
| Total Toe |  | 0.00° |  | 0.60° |  | --- |

[ << Back ] [ Print ]

*FIG. 3d*

NETWORK-BASED METHOD AND SYSTEM FOR DISTRIBUTING DATA

RELATED APPLICATIONS

This application is a continuation-in-part of the following co-pending patent application:

U.S. patent application, Ser. No. 10/054,793 filed on Jan. 25, 2002, now issued as U.S. Pat. No. 6,560,516 entitled "Method for Conducting Vehicle Diagnoses Using Distributed Structure," assigned to the assignee herein, which is a continuation of co-pending application, Ser. No. 08/962,023, filed Oct. 31, 1997, now issued as U.S. Pat. No. 6,405,111, entitled "System and Method for Distributed Computer Automotive Service Equipment," assigned to the assignee herein, which is a continuation-in-part of patent application Ser. No. 08/857,725, filed May 16, 1997 now issued as U.S. Pat. No. 6,285,932 and assigned to the assignee herein; all of which are incorporated herein by reference in their entireties.

The following patent applications are incorporated herein by reference in their entireties.

U.S. patent applications Ser. Nos. 09/951,100 and 09/951,101, both of which are entitled "Textual Data Storage System and Method," assigned to the assignee herein.

BACKGROUND

Computerized systems are used for many purposes, such as with an engine and the like. The engine may be included with any appropriate device, such as an automobile, or vehicle and the like. For example, computerized automotive service systems are widely used in servicing automotive vehicles. These computerized automotive service systems include wheel aligners, wheel balancers, engine analyzers, brake testers, hydraulic lifts and the like.

Some computerized automotive service systems generally include a sensor and a data processing system. The sensor may be used to operatively connect with a vehicle to collect signals representative of a diagnostic state or vehicle parameters. The data processing system receives and processes signals collected by the sensor and generates diagnostic results. The data processing system has all needed service data, such as software applications, specifications, permissible deviations, parameters, and/or user's manuals, etc., for conducting numerous automotive services for different vehicle models.

However, for example, since new vehicle models, specifications, and new and/or improved features in automotive service software are made available frequently, the data related to the vehicles may need to be updated from time to time. To do this, new versions of the data may be issued and distributed by sending customers storage media, such as CD-ROMs or cartridges. Other methods of updating are also possible. Accordingly, it is desirable to provide an update method that is relatively easy to implement not only by an end user but also by a data provider.

SUMMARY

Multiple methods and systems for distributing data over a data transmission network are disclosed.

In one embodiment, a user interface for soliciting selections of desired service data is provided. An input signal representative of a selection of desired service data is received via a data transmission network. Desired service data, including information needed for performing a service process, based on the selection is retrieved. The desired service data is transmitted to a data processing system via the data transmission network.

In another embodiment, a user interface for soliciting selections of desired service data is provided. An input signal representative of a selection of desired service data is received. Information representing a user is received. The user information is verified. Responsive to the information representing a user, the desired service data is transmitted to a data processing system via the data transmission network.

In an additional embodiment, a user interface for soliciting selections of desired service data is provided. An input signal representative a selection of desired service data is received. Payment information is received. Validation of the payment information is initiated. Responsive to validation of the payment information, desired service data is transmitted to a data processing system via the data transmission network.

In a further embodiment, a data processing system for providing service data over a data transmission network comprises a processor for processing data, a memory, a data storage device for storing data, a communication interface for operatively coupling to the data transmission network and transmitting data therefrom, and a bus operatively coupled to the memory, the data storage device, the communication interface, and the processor. The data storage device includes instructions to cause the data processing system upon execution of the instructions by the processor to perform various steps. Those steps can include providing a user interface for soliciting selections of desired service data, receiving an input signal representative of a selection of desired service data from the communication interface, retrieving the desired service data from the data storage device or a remote storage device operatively coupled to the data processing system, and transmitting the desired service data to a remote data processing system via the data transmission network. The remote data processing system may locate at the same site of the data processing system or any system connected to the data processing system via data transmission network, such as a local area network or the internet or the like. The service data can include information needed for carrying out a machine-implemented service process.

In another embodiment, a data processing system for providing service data over a data transmission network comprises a processor for processing data, a memory, a data storage device for storing data, a communication interface for operatively coupling to the data transmission network and transmitting data therefrom, and a bus operatively coupled to the memory, the data storage device, the communication interface, and the processor. The data storage device includes instructions to cause the data processing system upon execution of the instructions by the processor to perform various steps. The steps may include providing a user interface for soliciting selections of desired service data, receiving an input signal representative a selection of desired service data, receiving user information representing a user, verifying the user information, and, responsive to the user information representing a valid user, retrieving the desired service data from the data storage device or a remote storage device connected to the data processing system, and transmitting the desired service data to a remote data processing system via the data transmission network. The remote data processing system may locate at the same site of the data processing system or any system connected to the data processing system via data transmission network, such as a local area network or the internet or the like.

In another embodiment, a user interface for soliciting selections of desired data is displayed. An input signal representative a selection of desired data is received. A product code associated with a specific device or system is received. The product code is validated. Responsive to a valid product code, a license code based on the product code is generated. The license code is transmitted to a data processing system via the data transmission network. The desired data is retrieved. The desired data is transmitted to a data processing system via the data transmission network. The license code is required to access the desired data.

In a further embodiment, a data processing system for providing data over a data transmission network comprises a processor for processing data, a memory, a data storage device for storing the data, a communication interface operatively coupled to the data transmission network and transmitting data therefrom, and a bus operatively coupled to the memory, the data storage device, the communication interface, and the processor. The data storage device includes instructions to cause the data processing system upon execution of the instructions by the processor various steps. Those steps may include providing a user interface for soliciting selections of desired data, receiving an input signal representative a selection of desired data, receiving a product code associated with a specific device or system, validating the product code, responsive to a valid product code, generating a license code based on the product code, transmitting the license code to a remote data processing system via the data transmission network, retrieving the desired data from the data storage device, and transmitting the desired data to the remote data processing system via the data transmission network. The license code is required to access the desired data. The remote data processing system may locate at the same site of the data processing system or any system connected to the data processing system via data transmission network, such as a local area network or the internet or the like.

BRIEF DESCRIPTION OF THE DRAWINGS

The accompanying drawings, which are incorporated in and constitute a part of the specification, illustrate exemplary embodiments.

FIGS. 3a–3d show exemplary user interfaces for selecting desired service data from a website.

DETAILED DESCRIPTION OF ILLUSTRATIVE EMBODIMENTS

The embodiments described herein may include or be utilized with any appropriate engine having an appropriate voltage source, such as a battery, an alternator and the like, providing any appropriate voltage, such as about 12 Volts, about 42 Volts and the like. The embodiments described herein may be used with any desired system or engine. Those systems or engines may comprises items utilizing fossil fuels, such as gasoline, natural gas, propane and the like, electricity, such as that generated by battery, magneto, solar cell and the like, wind and hybrids or combinations thereof. Those systems or engines may be incorporated into another systems, such as an automobile, a truck, a boat or ship, a motorcycle, a generator, an airplane and the like.

SYSTEM ARCHITECTURE

Figure 1:
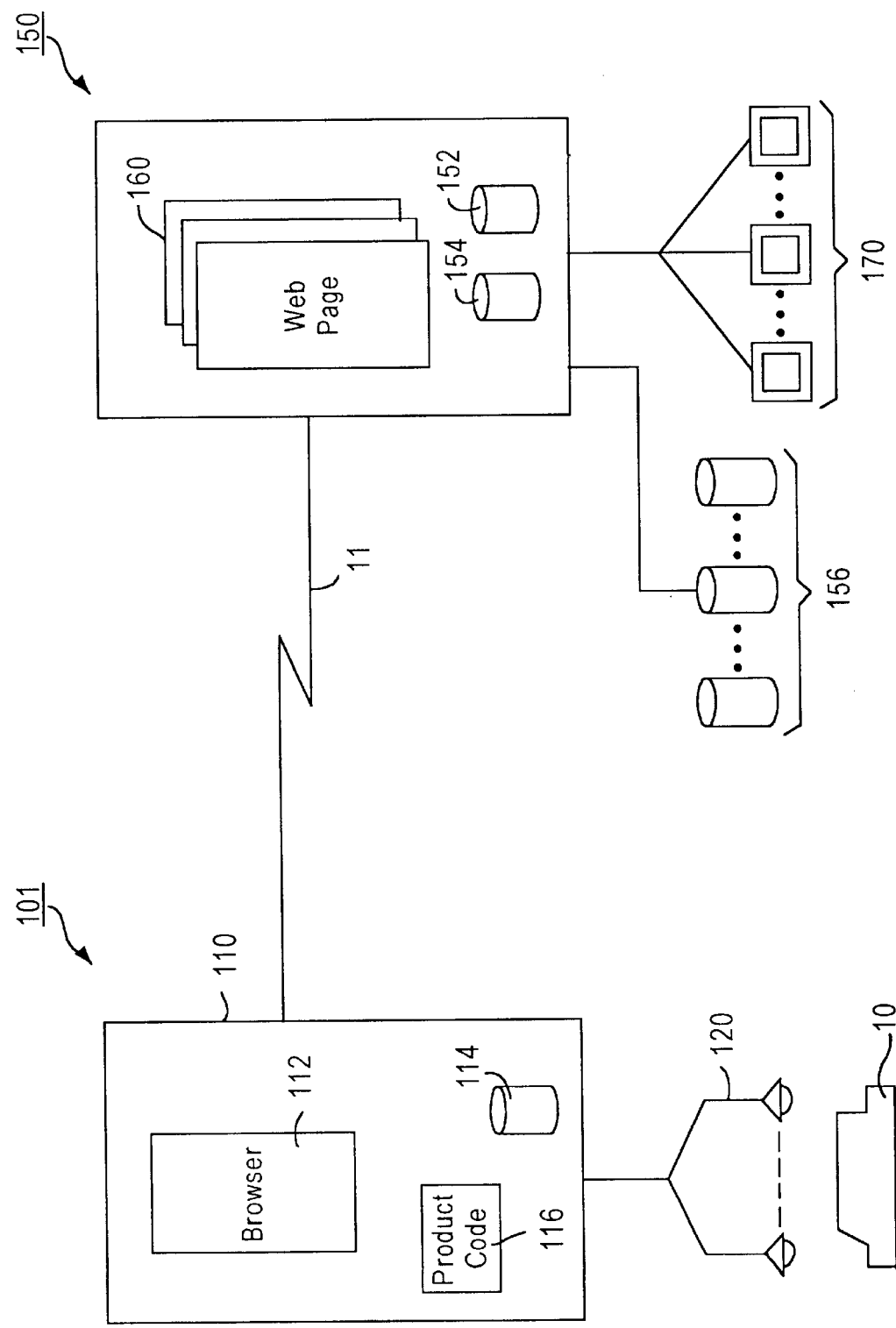
FIG. 1 is a schematic block diagram depicting an exemplary architecture of a network-based system for distributing data.

FIG. 1 shows a block diagram of an exemplary system architecture upon which an exemplary embodiment is implemented. The embodiment uses an automotive service system for illustrative purpose only. Similar principles and obvious variations may apply to various types of services, devices, parts, components, and/or systems, such as motorcycles, airplanes, powerboats, machines, equipment, etc. In addition, although service data is described for purpose of illustration, other data for various purposes can be distributed based on similar principles conveyed by the embodiments.

In FIG. 1, an automotive service system 101 includes a local data processing system 110 and measurement device 120, and is used to conduct vehicle diagnoses, such as engines, brakes, suspension or alignment analyses. The measurement device 120 is adapted to transmit signals representative of a vehicle diagnostic state to the local data processing system 120. Such information can be transmitted via a hard-wired cable and a serial connection, via infrared transmission and a serial connection, via radio frequency transmission and a serial connection, or any other known means.

Types of the measurement device 120 vary depending on the function of the automotive service system 101. If the automotive service system is an aligner, the measurement device 120 are angle detectors. If the automotive service system is an engine analyzer, the measurement device 120 may be probes for picking up electronic signals on a vehicle battery or a connector for connecting to an on-board signal outlet, such as OBD-II, to receive diagnostic code.

The local data processing system 110 executes one or more software applications to process the signals received from the measurement device 120 and generates a diagnostic result. For example, if the automotive service system 101 is an aligner, the data processing system calculates alignment parameters, such as toe, camber, caster, SAI, et cetera, based on the raw signals received form the measurement device 120 and compares the alignment parameters with alignment specifications of vehicle 10.

The local data processing system 110 can communicate with a remote service provider 150 via a data transmission network 11, such as the internet. The remote service provider 150 is a data processing system, such as a personal computer, that maintains a user database 154 and a service database 152. The user database 154 stores user information for users authorized to retrieve data from the provider, such as names, account numbers, credit card information, etc. The service database 152 stores various types of data, such as service data for various automotive services and vehicle models, such software applications, specifications, algorithm, parameters, user's manuals, and/or other data related to vehicle diagnoses.

The local data processing system may be implemented as a handheld system and configured to communicate with a remote data processing system via a wireless network. The remote data processing system can be the remote service provider 150, or a data processing system that can access the remote service provider 150 via a data transmission network, or.

The user database 154 and service database 152 may be maintained either on an internal data storage device within the system, such as an internal hard disk, or on an external data storage device 156 connected to the data processing system. The remote service provider 150 may further connect to other data processing systems or computer networks 170. The databases thus may be distributed on several other data processing systems that are connected to and accessible by the remote service provider 150.

The service database 152 is updated frequently to include the most updated service data. The local data processing system 110 can connect to the remote service provider 150, when desired, to access the most updated service data by sending a request to the remote service provider 150 and download the desired service data onto the local data processing system 110.

In one embodiment, the local data processing system 110 connects to the remote service provider 150 to download service data each time when automotive service is carried out. By downloading service data from the remote service provider 150 every time, the automotive service system ensures that the most updated service data is used for the automotive service.

In one aspect, the local data processing system 110 does not even have to store or install all of the service data necessary to perform vehicle diagnoses. Rather, when conducting a specific vehicle diagnosis, the local data processing system 110 connects to the remote service provider 150 and sends a request to retrieve required service data corresponding only to the specific diagnosis. In response, the remote service provider 150 retrieves the desired service data and transmits it to the local data processing system 110 via a data transmission network 11. The local data processing system 110 then conducts the specific diagnosis by executing the downloaded software applications and/or specifications.

For example, if the automotive service system 101 is used to conduct an alignment analysis, the local data processing system 110 does not have to maintain a database for alignment specifications and algorithm for different vehicle models. Rather, the local data processing system 110 connects to the remote service provider 150 to retrieve the most updated alignment specifications and algorithm for converting raw signals. After receiving the alignment specification and the algorithm, the local data processing system 101 converts raw signals received from the measurement device 120 into graphic readings and juxtaposes the graphic readings with graphic representations of alignment specification values retrieved from the remote service provider 150. An operator of the alignment system can observe the deviations from the specification value and make appropriate servicing adjustments.

The network connection between the automotive service system 101 and the remote service provider 150 is implemented using certain network protocols, such as TCP/IP (Transmission Control Protocol/Internet Protocol). TCP/IP allows communication between interconnected networks or computers having diverse hardware architectures and various operating systems. On an application level, the systems may use Hypertext Transfer Protocol (HTTP) to conduct data transfer between systems connected to the internet. TCP/IP provides source and destination addresses of the data. Furthermore, the local data processing system 110 and remote service provider 150 are both assigned a unique TCP/IP address.

The remote service provider 150 maintains a web site created by using, for example, Hypertext Markup Language (HTML). The web site contains a plurality of web pages 160 accessible by the local data processing system 110. The local data processing system 110 may use a web browser 112, such as the Internet Explorer® or Netscape®, to access the web pages and retrieve data from or submit data to the remote service provider 150.

When a user using the browser to submit a request to access a web page from the remote service provider 150, the browser locates the TCP/IP address for that particular page. The web pages contain user interfaces for a user of the automotive service system 101 to retrieve data stored in the service database 152 or entering data into user database 154.

HARDWARE OVERVIEW

Figure 2:
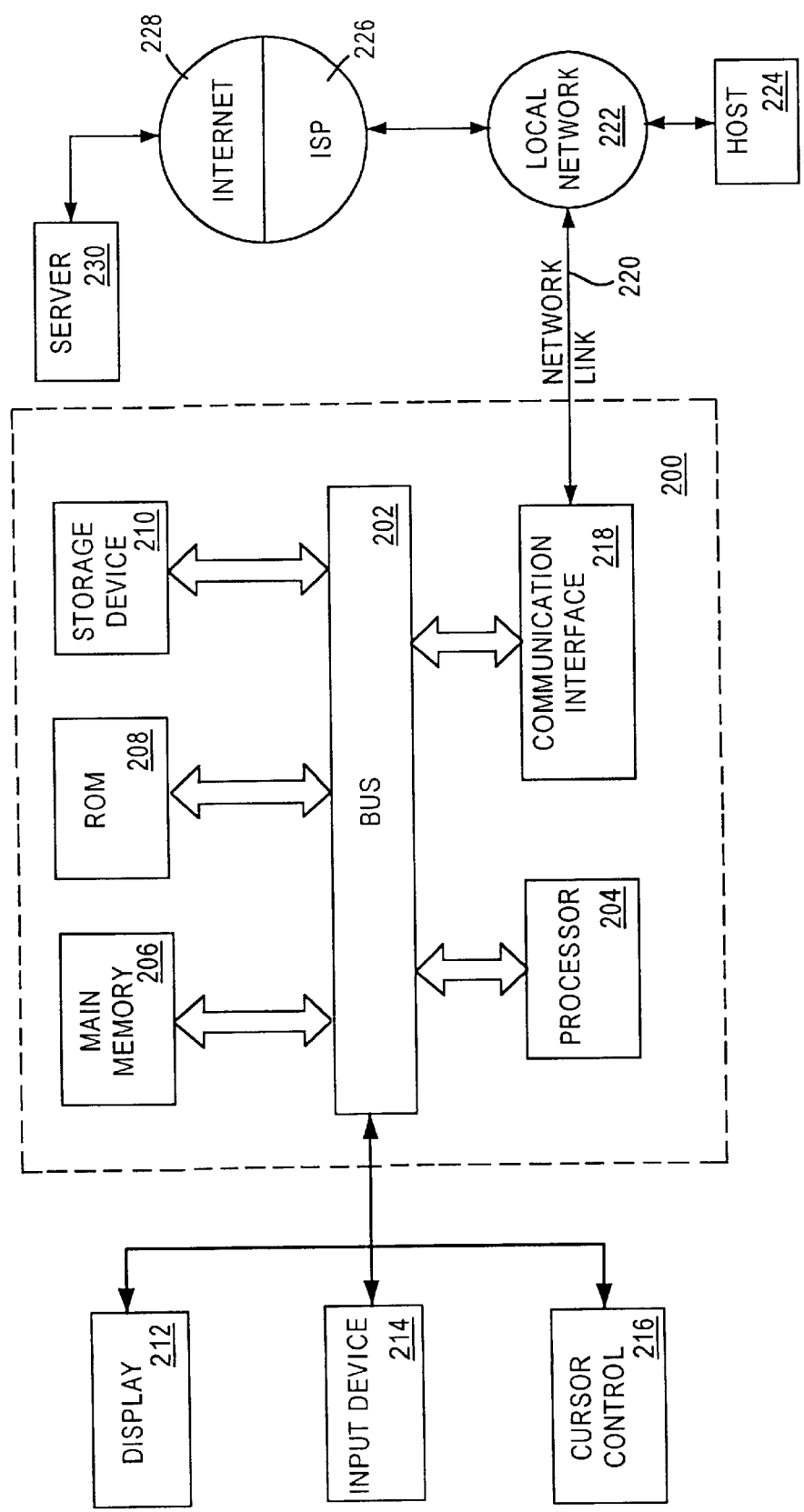
FIG. 2 shows an exemplary computer system that can be used to implement a data processing system described in an embodiment.

FIG. 2 is a block diagram that illustrates a computer system 200 upon which the local data processing system 110 and the remote service provider 150 may be implemented. Computer system 200 includes a bus 202 for communicating information, and a processor 204 operatively coupled with bus 202 for processing information. Computer system 200 also includes a main memory 206, such as a random access memory (RAM) or other dynamic storage device, operatively coupled to bus 202 for storing information and instructions to be executed by processor 204. A read only memory (ROM) 208 or other static storage device is operatively coupled to bus 202 for storing static information and instructions for processor 204. A storage device 210, such as a magnetic disk or optical disk, is provided and operatively coupled to bus 202 for storing information and instructions.

Computer system 200 may be operatively coupled via bus 202 to a display 212, such as a cathode ray tube (CRT), for displaying information to a computer user. An input device 214, including alphanumeric and other keys, may be operatively coupled to bus 202 for communicating information and command selections to processor 204. Another type of user input device is cursor control 216, such as a mouse, a trackball, or cursor direction keys for communicating direction information and command selections to processor 104 and for controlling cursor movement on display 212.

Computer system 200 has a communication interface 218 operatively coupled to bus 202. Communication interface 218 provides a two-way data communication operatively coupled to a network link 220 that is connected to a local network 222. Wireless links may also be implemented.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network, such as the internet 228.

USER INTERFACE

FIGS. 3a–3d show an exemplary user interfaces provided by the remote service provider 150 for a user to access alignment specifications for different vehicle models. The user interface provides a tool bar including clickable buttons of "view specifications online" 31, "download specifications" 33, "buy a license" 35 for downloading specifications or software applications, "my account" 37 for viewing or modifying the user's account information, and "support" 39 for technical support.

Figure 3A:
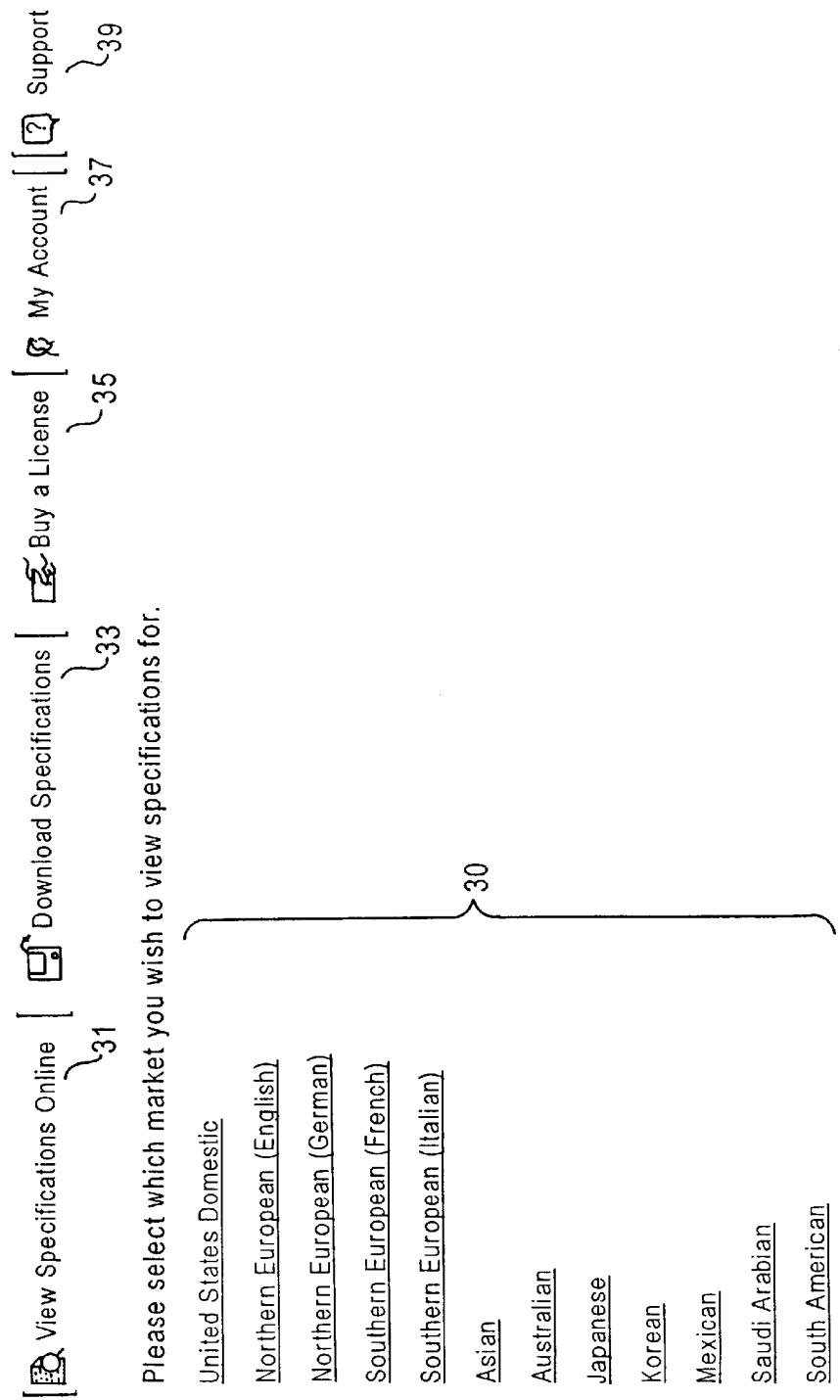
Figure 3B:

In FIG. 3a, the user interface provides a vehicle list 30 to solicit inputs from the user to select the country of vehicle for which he or she wishes to download specification. In response to a selection of a country in list 30, the remote service provider 150 provides a second user interface, in FIG. 3b, to solicit selection of vehicle manufacturers. A pull-down window listing carmakers is provided. In FIG. 3b, Acura is selected.

After a carmaker is selected, the remote service provider 150 further provides a user interface asking the user to input information related to vehicle model and make year. The remote service provider 150 retrieves the alignment specification corresponding to the selected vehicle and sends it to the user. FIG. 3d shows an exemplary alignment specification for 1999 Acura 3.0 CL. The user may choose to download the specification to the local data processing system 110 or simply print out the specification for review.

SYSTEM SECURITY AND MANAGEMENT

The remote service provider may restrict access to the website only by valid users, such as users who have purchased the automotive service system from a specific source and/or those with a valid subscription to the service.

In order to limit access to valid users only, the remote service provider controls the distribution of service data based on, for example, a product code unique to each automotive service system made by a specific company. Every automotive service system sold by the specific company includes a circuit or add-on card 116 with an embedded product code unique to each machine. Alternatively, the product code may be generated by a software application and stored in a specific location of non-volatile memories that is accessible by software applications.

The remote service provider maintains a database for valid product codes, such as product codes for all automotive service systems made by the specific company. Each time an automotive service system connects to the remote service provider to access service data, the remote service provider will require submission of the product code. The product code can be submitted by manual entry or automatic retrieval by software running on the local data processing system.

Based on the product code submitted by the automotive service system, the remote service provider accesses the user database of valid product codes and determines whether the received product code matches one of the valid product codes. In response to a match, the remote service provider authorizes the automotive service system to access the service data; otherwise, access is denied.

According to one embodiment, system security may by obtained by using activation codes to control distribution of the service data. An activation code is similar to a key to unlock the service data downloaded to automotive service systems. Only authorized users will be provided with an activation code. Without a valid activation code, even if the service data is properly downloaded, it cannot be properly installed on or used by the automotive service system. The activation code may be provided to customers when the automotive systems are shipped or obtained by telephone or e-mail when users subscribe to the service.

Activation codes can be used in conjunction with product codes to achieve higher system security. For instance, the remote service provider generates an activation code based on a product code submitted by a valid user. The activation code is then sent to the user for activating the downloaded service data. A software program that runs on the automotive service system will access the product code of the automotive service system and determine whether the product code of the automotive service system matches with the product code from which the activation code is generated. Unless a proper match is obtained, the activation code will not unlock the downloaded software. By this process, verification of identities of hardware and software is conducted. Thus, duplicates of downloaded service data and activation code cannot properly operate on other unauthorized automotive service systems, as a check of product codes would not generate a match.

The remote service provider may also control access to the system by creating a database for valid users. For example, only those users registered on the website and paying fees can access to the service data. Users will be requested to log in every time with a user ID and password so that the remote service provider may determine identity of a user. Automatic log-in can be achieved by verifying identity codes embedded in the requests sent by an automotive service system. For example, when a user uses a web browser to access the website maintained by the remote service provider, "cookies," which are widely used to track a specific computer system, can be utilized to determine a user's identity and whether the system has subscribed to the service.

The website may allow users to purchase a license to view or download service data. The license allows a user to access the service data for a certain period of time. A license code will be generated and sent to the licensee. In certain aspects, a license code is similar to an activation code described above, as the license code is necessary for unlocking and accessing the downloaded service data. The license code may be stored at a specific location on a non-volatile memory. The downloaded service data, when executed or accessed, will verify whether a valid license code exists.

In order to ensure that the downloaded data is effective only within the licensed period, an expiration date is encoded into the license code. When the automotive service system executes or accesses the downloaded service data, the license code will be read out and compared with system time to determine whether the license is still valid.

Other information can also be embedded in the license code to increase system security and prevent unauthorized distribution of service data. For example, a license code may include a product code submitted by the user when obtaining a license. Each time the service data is executed or accessed, a program will retrieve the product code from the license code and determine whether the product code of the automotive service system matches the one retrieved from the license code.

Users may use a credit card to pay for a license. If a user indicates her preference to pay with a credit card, such as by clicking on a "pay by credit card" button on the web page, the remote service provider will collect credit card information from the user and submit it to a remote validation system, such as a server managed by VeriSign®, for validation.

The remote service provider may allow an automotive service system to access the service data even if the automotive service system is without a unique product code. The automotive service system will be asked to download an installation program. The installation program, when executed, accesses the controller of a hard disk installed on the automotive service system and obtains a serial number of the hard disk. The installation program then generates a unique ID based on the serial number of the hard disk. The unique ID is treated as a product code as described above and sent to the remote service provider. After the user is properly licensed, the unique ID is used to generate an activation code or license code as discussed above.

Figure 4:
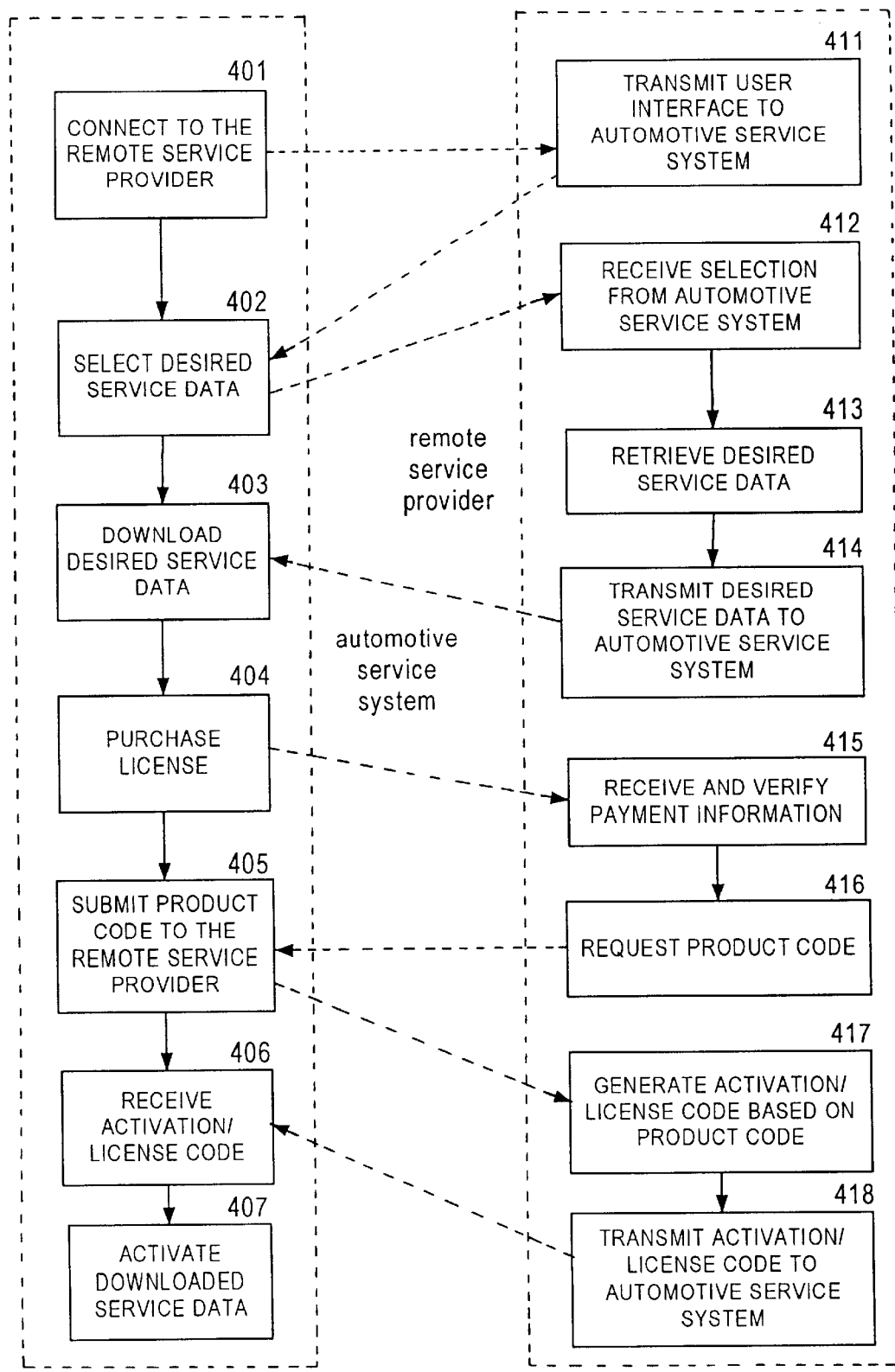
FIG. 4 depict an exemplary process for downloading service data by a first time user from the remote service provider.

FIG. 4 illustrates an example of the process for downloading service data by a first time user from the remote service provider and the interaction between the systems. The automotive service system connects to the remote service provider by entering a website address corresponding to the remote service provider to access the website (step 401). In response, the remote service provider sends web pages containing user interfaces to solicit selections of desired service data for specific automotive services and/or vehicle models (step 411). The user inputs information related to desired service data (step 402) and sends it to the remote service provider.

After receiving information related to desired service data (step 412), the remote service provider accesses and retrieves the desired service data from a local data storage device or other data processing system, or both (step 413), and transmits the retrieved service data to the automotive service system (step 414).

Since the automotive service system is a first time user, which means the system is not authorized to access the service data yet, the automotive service system needs to purchase a license by, for example, clicking the "buy a license" button shown in FIGS. 3a–3d (step 404). The remote service provider processes payment information submitted by the user and conducts the validation process as described above (step 415). If the payment is approved, the automotive service system is requested to submit a product code to the remote service provider (step 416). The product code can be entered manually by the operator of the automotive service system or retrieved by an installer program downloaded from the remote service provider.

After the remote service provider receives the product code, it generates a license code or activation code as discussed above, depending on the type of security system the remote service provider adopts (step 417). The license code/activation code is then sent to the automotive service system (step 418 and 406). The automotive service system activates the downloaded service data with the activation/license code (step 407).

The sequence of the process is flexible and can be changed. For example, a user may be requested to purchase a license first before he can download any data from the website.

Figure 5:
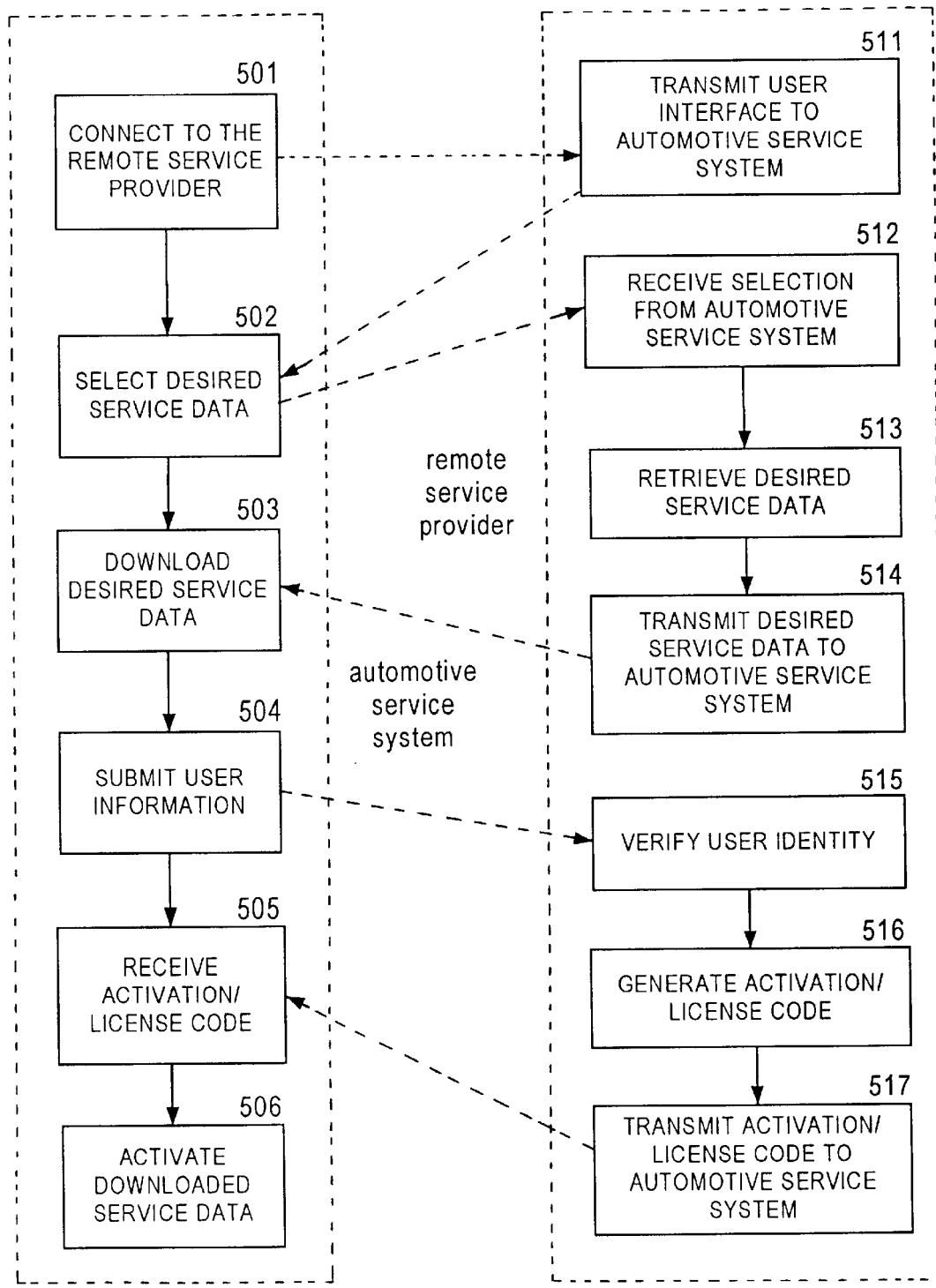
FIG. 5 shows an exemplary process for licensed users to download service data from the remote service provider and the interaction between the systems.

FIG. 5 shows an exemplary process for downloading service data by a user already with a license. The automotive service system connects to the remote service provider by entering a website address corresponding to the remote service provider to access the website (step 501). In response, the remote service provider sends web pages containing user interfaces to solicit selection of desired service data for specific automotive services or vehicle models (step 511). The user inputs information related to desired service data (step 502) and sends it to the remote service provider.

After receiving the information related to desired service data, the remote service provider accesses and retrieves the desired service data from the local data storage device or other data processing system, or both (step 513) and transmits the retrieved service data to the automotive service system (step 514).

In the example of FIG. 5, the automotive service system already has a license to download service data or a valid account on the remote service provider. The automotive service system will be asked to submit user information by, for example, sending account information or license information. The remote service provider retrieves and verifies the user identity based on the information submitted by the user (step 515). An activation/license code will be generated based on the account information and sent to the automotive service system (steps 516 and 517).

Embodiments discussed above also apply to distributing numerous types of data, for example, service data for different types of systems, such as automobile, motorcycles, airplanes, powerboats, machines, equipment, etc. Other types of data may include testing process, expert database, software applications, drivers, update files, etc. Those skilled in the art will recognize, or be able to ascertain using no more than routine experimentation, many equivalents to the specific embodiments specifically described herein. Such equivalents are intended to be encompassed in the scope of the following claims.

What is claimed is:

1. A machine-implemented method for providing service data over a data transmission network, comprising the steps of:

providing a user interface for soliciting selections of desired service data;

receiving an input signal representative of a selection of desired service data via the data transmission network;

receiving input representing a product code associated with a device or system;

retrieving the desired service data based on the selection;

generating a license code with embedded information related to the product code for activating the desired service data; and transmitting the desired service data and the license code to a data processing system via the data transmission network;

wherein the service data includes information needed for carrying out a machine-implemented service process and the license code is implemented to access the desired service data.

2. The method of claim 1, wherein the service data is indexed by types of diagnoses and models.

3. The method of claim 1, wherein the service data is used to convert signals representative of a vehicle diagnostic state into a processed diagnostic signal.

4. The method of claim 1, wherein the service data includes alignment specifications.

5. A machine-implemented method for providing service data over a data transmission network, comprising the steps of:

providing a user interface for soliciting selections of desired service data;

receiving an input signal representative of a selection of desired service data;

receiving user information including a product code associated with a device or system;

verifying the user information;

generating a license code with embedded information related to the product code for activating the desired service data; and responsive to the user information representing a valid user, transmitting the desired service data and the license code to a data processing system via the data transmission network;

wherein the license code is implemented to access the desired service data.

6. The method of claim 5, wherein the product code is unique to a specific device or system.

7. The method of claim 6, wherein the verifying step includes comparing the product code with a database of valid product codes.

8. The method of claim 5, wherein the service data is used to convert signals representative of a vehicle diagnostic state into a processed diagnostic signal.

9. A machine-implemented method for providing service data over a data transmission network, comprising the steps of:
- providing a user interface for soliciting selections of desired service data;
- receiving an input signal representative a selection of desired service data;
- receiving payment information;
- initiating validation of the payment information;
- receiving a product code associated with a device or system;
- generating a license code with embedded information related to the product code; and
- responsive to validation of the payment information, transmitting the desired service data and the license code to a data processing system via the data transmission network;
- wherein the license code is required to access the desired service data.

10. The method of claim 9, wherein the payment information includes credit card information.

11. The method of claim 10, wherein the initiating step includes sending credit card information to a remote data processing system via the data transmission network for validation.

12. The method of claim 9, wherein the service data is used to convert signals representative of a vehicle diagnostic state into a processed diagnostic signal.

13. The method of claim 9, wherein the license code includes an expiration date and cannot be used to access the service data after the expiration date.

14. The method of claim 9, wherein a correct combination of the product code and the license code is required to access the service data.

15. A data processing system for providing service data over a data transmission network, comprising:
- a processor for processing data;
- a memory;
- a data storage device for storing data;
- a communication interface for operatively coupling to the data transmission network and transmitting data therefrom; and
- a bus operatively coupled to the memory, the data storage device, the communication interface, and the processor;
- the data storage device bearing instructions to cause the data processing system upon execution of the instructions by the processor to perform the steps of:
- providing a user interface for soliciting selections of desired service data;
- receiving an input signal representative of a selection of desired service data from the communication interface;
- retrieving the desired service data from the data storage device or a remote storage device operatively coupled to the data processing system;
- receiving a product code associated with a device or system;
- generating a license code including embedded information related to the product code; and
- transmitting the desired service data and the license code to a remote data processing system via the data transmission network;
- wherein the service data includes information needed for carrying out a machine-implemented service process and the license code is implemented to access the service data.

16. The system of claim 15, wherein the data storage device further bearing instructions to cause the data processing system upon execution of the instructions by the processor to perform the steps of:
- receiving payment information; and
- initiating validation of the payment information.

17. The system of claim 15, wherein a correct combination of the product code and the activation code required to access the service data.

18. The system of claim 15, wherein the product code is unique to a data processing system.

19. The system of claim 15, wherein the product code is a number associated with a component of a data system.

20. The system of claim 19, wherein the license code includes an expiration date and cannot be used to access the service data after the expiration date.

21. A data processing system for providing service data over a data transmission network, comprising:
- a processor for processing data;
- a memory;
- a data storage device for storing data;
- a communication interface for operatively coupling to the data transmission network and transmitting data therefrom; and
- a bus operatively coupled to the memory, the data storage device, the communication interface, and the processor;
- the data storage device bearing instructions to cause the data processing system upon execution of the instructions by the processor to perform the steps of:
- providing a user interface for soliciting selections of desired service data;
- receiving an input signal representative a selection of desired service data;
- receiving user information representing a user;
- verifying the user information;
- responsive to the user information representing a valid user, retrieving the desired service data from the data storage device or a remote storage device connected to the data processing system;
- receiving a product code representing a device or system;
- responsive to the user information representing a valid user, generating a license code with embedded information related to the product code; and
- transmitting the desired service data and the license code to a remote data processing system via the data transmission network;
- wherein the license code is implemented to access the service data.

22. The system of claim 21, wherein the license code includes information related to an expiration date and becomes invalid after the expiration date.

23. The system of claim 21, wherein a correct combination of the product code and the license code is required to access the service data.

24. A machine-implemented method for providing data over a data transmission network, comprising the steps of:

providing a user interface for soliciting selections of desired data;

receiving an input signal representative a selection of desired data;

receiving a product code associated with a specific device or system;

validating the product code;

responsive to a valid product code, generating a license code with embedded information related to the product code; and transmitting the license code to a remote data processing system via the data transmission network;

retrieving the desired data; and transmitting the desired data to the remote data processing system via the data transmission network;

wherein the license code is required to access the desired data.

25. The method of claim 24, including using the data to convert signals representative of a vehicle diagnostic state into a processed diagnostic signal.

26. The method of claim 24, wherein a correct combination of the product code and license code is required to access the desired data.

27. A data processing system for providing data over a data transmission network, comprising:

a processor for processing data;

a memory;

a data storage device for storing the data;

a communication interface for operatively coupling to the data transmission network and transmitting data therefrom; and a bus operatively coupled to the memory, the data storage device, the communication interface, and the processor;

the data storage device bearing instructions to cause the data processing system upon execution of the instructions by the processor to perform the steps of:

providing a user interface for soliciting selections of desired data;

receiving an input signal representative a selection of desired data;

receiving a product code associated with a specific device or system;

validating the product code;

responsive to a valid product code, generating a license code with embedded information related to the product code;

transmitting the license code to a remote data processing system via the data transmission network;

retrieving the desired data from the data storage device; and transmitting the desired data to the remote data processing system via the data transmission network;

wherein the license code is required to access the desired data.

28. The system of claim 27, wherein a correct combination of the product code and license code is required to access the desired data.

29. A data processing system for providing data over a data transmission network, comprising:

means for processing data;

means for storing data;

means for operatively coupling to the data transmission network for transmitting or receiving data therefrom; and bus means for transmitting data thereon, the bus means operatively coupled to the means for storing data, the means for operatively coupling to the data transmission network, and the means for processing data;

the means for storing data bearing instructions to cause the data processing system upon execution of the instructions by the means for processing data to perform the steps of:

providing a user interface for soliciting selections of desired data;

receiving an input signal representative a selection of desired data;

receiving a product code associated with a specific device or system;

validating the product code;

responsive to a valid product code, generating a license code with embedded information related to the product code;

transmitting the license code to a remote data processing system via the data transmission network;

retrieving the desired data from the means for storing data; and transmitting the desired data to the remote data processing system via the data transmission network;

wherein the license code is required to access the desired data.

30. The system of claim 29, wherein a correct combination of the product code and license code is required to access the desired data.

\* \* \* \* \*

US006859699C1

(12) INTER PARTES REEXAMINATION CERTIFICATE (875th)
United States Patent
Carroll et al.

(10) Number: US 6,859,699 C1
(45) Certificate Issued: May 12, 2014

(54) NETWORK-BASED METHOD AND SYSTEM FOR DISTRIBUTING DATA

(75) Inventors: Anthony Carroll, Cork (IE); Brian McAuliffe, Co. Cork (IE); Joe Gibbs, County Limerick (IE); Brian O'Sullivan, County Cork (IE); Michael J. Kling, III, Delafied, WI (US); George M. Gill, Vilonia, AR (US); Michael L. Baird, Morro Bay, CA (US); Jean deBelleuille, Harpswell, ME (US); Steven W. Rogers, Conway, AR (US)

(73) Assignee: API Technologies, LLC, Marshall, TX (US)

Reexamination Request:
No. 95/001,333, Apr. 1, 2010

Reexamination Certificate for:
Patent No.: 6,859,699
Issued: Feb. 22, 2005
Appl. No.: 10/066,795
Filed: Feb. 6, 2002

Related U.S. Application Data

(63) Continuation-in-part of application No. 10/054,793, filed on Jan. 25, 2002, now Pat. No. 6,560,516, which is a continuation of application No. 08/962,023, filed on Oct. 31, 1997, now Pat. No. 6,405,111, which is a continuation-in-part of application No. 08/857,725, filed on May 16, 1997, now Pat. No. 6,285,932.

(51) Int. Cl.
*H04L 29/06* (2006.01)
*B60R 19/02* (2006.01)
*H04L 29/08* (2006.01)

(52) U.S. Cl.
USPC .......... 701/32.6; 701/34.3; 717/172; 717/177

(58) Field of Classification Search
None
See application file for complete search history.

(56) References Cited

To view the complete listing of prior art documents cited during the proceeding for Reexamination Control Number 95/001,333, please refer to the USPTO's public Patent Application Information Retrieval (PAIR) system under the Display References tab.

*Primary Examiner* — Matthew Heneghan

(57) ABSTRACT

A network-based method and system for distributing data, such as service data for various types of service processes and models, including software applications, specifications, user's manuals, or parameters, etc., over a data transmission network. A remote service provider maintains a database of the data. The database is updated frequently. The remote service provider maintains a website for authorized users to access the data. Authorized users can access and download desired data by connecting to the remote service provider via the data transmission network. Certain approaches are used to verify a user's identity. In one aspect, a combination of a product code that is specific to a system and a license/activation code that is generated based on the product code is verified. Unless a proper combination exists, the downloaded data cannot be properly accessed. The remote service provider also allows users to purchase a license to access the data online. Therefore, users can access the most updated data without waiting for CD-ROMs containing new software or specifications to arrive.

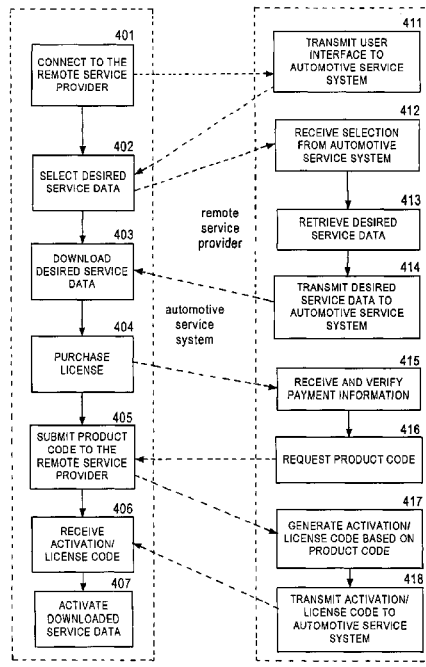

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1, 5-7, 9-11, 13-24 and 26-30 are cancelled.
Claims 2-4, 8, 12 and 25 were not reexamined.

\* \* \* \* \*